United States Patent
Kyoo (10) Patent No.: US 8,958,110 B2
(45) Date of Patent: Feb. 17, 2015

(54) DISPLAYING IMAGE FORMING APPARATUS JOB SETTINGS ON A PORTABLE APPARATUS

(71) Applicant: Konica Minolta, Inc., Chiyoda-ku (JP)

(72) Inventor: Shunsaku Kyoo, Kawabe-gun (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/254,140

(22) Filed: Apr. 16, 2014

(65) Prior Publication Data

US 2014/0320903 A1   Oct. 30, 2014

(30) Foreign Application Priority Data

Apr. 26, 2013   (JP) .................. 2013-094777

(51) Int. Cl.
   *G06F 3/12*   (2006.01)
(52) U.S. Cl.
   CPC ............ *G06F 3/1292* (2013.01); *G06F 3/1268* (2013.01); *G06F 3/1211* (2013.01); *G06F 3/1255* (2013.01)
   USPC ........................................................ 358/1.15
(58) Field of Classification Search
   CPC .................................................... G06F 3/1292
   USPC ........................................................ 358/1.15
   See application file for complete search history.

(56) References Cited

U.S. PATENT DOCUMENTS

| | | |
|---|---|---|
| 5,911,067 A | 6/1999 | Owens et al. |
| 2010/0302582 A1 | 12/2010 | Yoshimura |

FOREIGN PATENT DOCUMENTS

| | | | |
|---|---|---|---|
| JP | 2008-108010 A | 5/2008 |
| JP | 2009-176086 A | 8/2009 |
| JP | 2010-283472 A | 12/2010 |
| JP | 2013-222307 A | 10/2013 |

*Primary Examiner* — Eric A Rust
(74) *Attorney, Agent, or Firm* — Buchanan Ingersoll & Rooney PC (57) ABSTRACT

A portable terminal apparatus has a first application and a cooperation application installed thereon. The portable terminal apparatus includes a display; a communication portion that performs communication with a job execution apparatus; an obtaining portion that obtains user information objects and settings information objects from the job execution apparatus; a screen data generator that generates job execution screens on the basis of the obtained information objects; a connecting portion that connects each of the screens to the cooperation application and a calling information object; a calling portion that calls the cooperation application by specifying the calling information object, the calling information object including the user information object of a user who operates the first application; and a display controller that identifies a screen connected to the calling information object including the user information object of the user who operates the first application and makes the display show the identified screen.

9 Claims, 6 Drawing Sheets

| User Name | Available Functions/Settings | | UI Screen | Intent Name and URL Scheme Name |
|---|---|---|---|---|
| | Function | Settings | | |
| User A "userA" | Print/Scan/FAX | Scan/FAX: All settings<br><br>Print: Black-and-white print settings only | Print: Black-and-white print settings only (UI Screen No.1)<br>Scan: All settings (UI Screen No. 2)<br>FAX: All settings (UI Screen No. 3) | [Scan] userA.scan.xxx.ne.jp @"http://www.userA.com<br>[FAX] userA.fax.xxx.ne.jp @"http://www.userA.com<br>[Print] userA.print.xxx.ne.jp @"http://www.userA.com |
| User B "userB" | Scan/FAX | All settings | Scan: All settings (UI Screen No. 2)<br>FAX: All settings (UI Screen No. 3)<br>Print: Prohibited (UI Screen No. 4) | [Scan] userB.scan.independent_intent.com<br>[FAX] userB.fax.independent_intent.com<br>[Print] userB.print.independent_intent.com |

FIG.5

| Available Functions/ Settings | User B "userB" | User C "userC" |
|---|---|---|
| Function | Print/Scan/FAX | Print |
| Settings | All settings | Black-and-white print settings only |

DISPLAYING IMAGE FORMING APPARATUS JOB SETTINGS ON A PORTABLE APPARATUS

This application claims priority under 35 U.S.C. §119 to Japanese Patent Application No. 2013-094777 filed on Apr. 26, 2013, the entire disclosure of which is incorporated herein by reference in its entirety.

BACKGROUND OF THE INVENTION

1. Field of the Invention

The present invention relates to a portable terminal apparatus such as a smartphone or tablet computer terminal; a method of displaying job execution settings screens, being implemented by the portable terminal apparatus; and a recording medium having a program of displaying job execution settings screens, being stored thereon.

2. Description of the Related Art

The following description sets forth the inventor's knowledge of related art and problems therein and should not be construed as an admission of knowledge in the prior art.

In recent years, portable terminal apparatuses with various operating systems (OSs) such as Android OS and iOS, e.g., smartphones and tablet computer terminals, have been broadly used.

Such portable terminal apparatuses are capable of having various applications installed; and techniques called "intent" and "URL scheme" are employed on such portable terminal apparatuses with Android OS and iOS, respectively, as a feature to build a link between functions from different applications. When a user performs settings on an application-based screen, these inter-application cooperation techniques suggest one or more applications for configuring the item on the screen so that he/she can select a desirable one, for example a print application, from the suggestions, then call the user selected application to activate.

More specifically, by supporting "intent" cooperation between a cloud storage service application and a print application for example, these inter-application cooperation techniques allow users to make a specified printer print a document file stored on a cloud storage service without giving additional instructions on any application.

Meanwhile, some printers such as multi-function peripherals (MFPs) that are multifunctional digital image forming apparatuses are configured to restrict users to use functions of the MFPs themselves and display different screens on their operation panels depending on the user.

However, portable terminal apparatuses which processes data may have applications produced by third-party vendors, not printer makers. In such a case, when a user operates a MFP from such a portable terminal apparatus, the above-mentioned inter-application cooperation techniques, i.e., "intent" and "URL scheme" calls a job execution application such as a print application but may not display job execution settings screens that reflect the user's restricted functions on the MFP, in accordance with the job execution application. This caused confusion among users.

Japanese Unexamined Patent Publication No. 2010-283472 discloses a technique that allows an image forming apparatus to manage licenses for each application and perfectly implement restriction of functions.

Specifically, an application manager detects restricted functions of users from those of an application. A service server stores the restricted functions detected by the application manager, being registered thereon. When a user gives instructions to execute a function by operating an application, the service server judges whether or not it is registered as one of the restricted functions. If it is not registered as one of the restricted functions, execution of the requested function is permitted; if it is registered as one of the restricted functions, execution of the requested function is prohibited.

Actually, the technique disclosed in Japanese Unexamined Patent Publication No. 2010-283472 is not based on the idea of using any inter-application cooperation technique such as "intent" or "URL scheme", thus it could not provide any perfect solution to the problem of causing confusion among users because an inter-application cooperation technique does not display job execution settings screens that reflect the user's restricted functions on the MFP.

The portable terminal apparatus may be configured to obtain user information objects indicating users registered on the MFP and settings information objects indicating settings for the respective users via an application produced by third-party vendors, then generate and display job execution settings screens that reflect restricted functions of the respective users on the basis of the obtained information objects.

In such a case, highly-complicated applications need to be developed and users are not allowed to make an MFP execute a job from an application easily by using an inter-application cooperation technique such as "intent" or "URL scheme", which is a problem because it opposes the recent technical trend.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to a portable terminal apparatus being capable of having the following applications installed thereon: a first application; and a cooperation application supporting cooperation between the first application and a job execution apparatus, the portable terminal apparatus comprising:

a display;

a communication portion that performs communication with the job execution apparatus;

an obtaining portion that obtains user information objects indicating users registered on the job execution apparatus and settings information objects indicating settings for the respective users, from the job execution apparatus through the communication part, in accordance with the cooperation application;

a screen data generator that generates job execution settings screens for the respective users on the basis of the user information objects and the settings information objects both obtained by the information obtaining portion, in accordance with the cooperation application;

a connecting portion that connects each of the settings screens generated by the screen data generator, to the cooperation application and a calling information object for calling the settings screen in accordance with the cooperation application, the calling information object being predefined in such a manner that one of the user information objects is included therein;

a calling portion that calls the cooperation application by specifying the calling information object, the calling information object including the user information object indicating a user who operates the first application to make the job execution apparatus execute a job on data processed by the first application; and a display controller that identifies a settings screen connected to the calling information object including the user information object indicating the user who operates the first application, among the settings screens connected to the calling information objects by the connecting portion, and makes the display show the identified settings screen, in accordance with the cooperation application called by the calling portion.

A second aspect of the present invention relates to a method of displaying job execution settings screens, the method to be implemented by a portable terminal apparatus being capable of having the following applications installed thereon: a first application; and a cooperation application supporting cooperation between the first application and a job execution apparatus, the method comprising:

performing communication with the job execution apparatus;

obtaining user information objects indicating users registered on the job execution apparatus and settings information objects indicating settings for the respective users, by communicating with the job execution apparatus, in accordance with the cooperation application;

generating job execution settings screens for the respective users on the basis of the user information objects and the settings information objects both being obtained, in accordance with the cooperation application;

connecting each of the generated settings screens to the cooperation application and a calling information object for calling the settings screen in accordance with the cooperation application, the calling information object being predefined in such a manner that one of the user information objects is included therein;

calling the cooperation application by specifying the calling information object, the calling information object including the user information object indicating a user who operates the first application to make the job execution apparatus execute a job on data processed by the first application; and identifying a settings screen connected to the calling information object including the user information object indicating the user who operates the first application, among the settings screens connected to the calling information objects and displaying the identified settings screen on a display, in accordance with the called cooperation application.

A third aspect of the present invention relates to a non-transitory computer-readable recording medium having a program of displaying job execution settings screens, the program being stored thereon to make a computer of a portable terminal apparatus being capable of having the following applications installed thereon: a first application; and a cooperation application supporting cooperation between the first application and a job execution apparatus, execute the following steps:

performing communication with the job execution apparatus;

obtaining user information objects indicating users registered on the job execution apparatus and settings information objects indicating settings for the respective users, by communicating with the job execution apparatus, in accordance with the cooperation application;

generating job execution settings screens for the respective users on the basis of the user information objects and the settings information objects both being obtained, in accordance with the cooperation application;

connecting each of the generated settings screens to the cooperation application and a calling information object for calling the settings screen in accordance with the cooperation application, the calling information object being predefined in such a manner that one of the user information objects is included therein;

calling the cooperation application by specifying the calling information object, the calling information object including the user information object indicating a user who operates the first application to make the job execution apparatus execute a job on data processed by the first application; and identifying a settings screen connected to the calling information object including the user information object indicating the user who operates the first application, among the settings screens connected to the calling information objects and displaying the identified settings screen on a display, in accordance with the called cooperation application.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, some embodiments of the present invention will be described in combination with the accompanying drawings.

Figure 1:
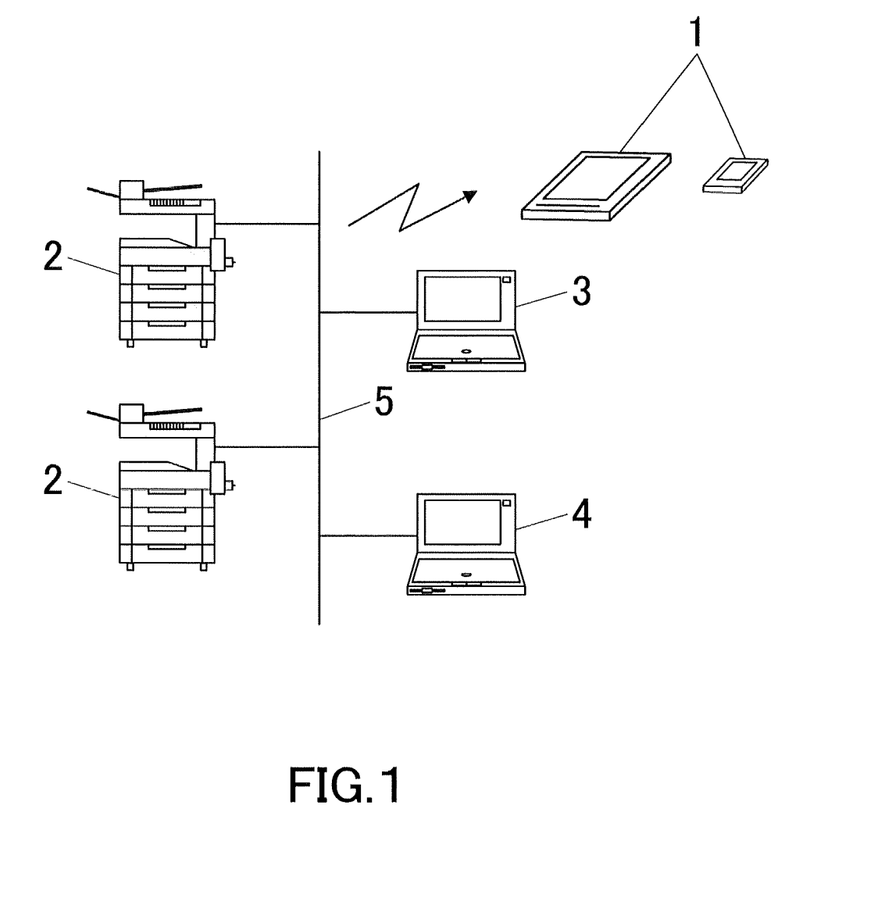
FIG. 1 is a system configuration diagram illustrating a cooperation system including a portable terminal apparatus according to one embodiment of the present invention, along with the cooperation between the portable terminal apparatus and a job execution apparatus.

FIG. 1 is a system configuration diagram illustrating a cooperation system including a portable terminal apparatus according to one embodiment of the present invention, along with the cooperation between the portable terminal apparatus and a job execution apparatus.

The cooperation system is provided with: a portable terminal apparatus 1 such as a smartphone or tablet computer terminal; one or more image forming apparatuses 2 each serving as a job execution apparatus; a web server 3; a personal computer 4; and others, all of which are physically or wirelessly connected to each other via a network 5.

In this embodiment, the image forming apparatus 2 is represented by a multi-function peripheral (MFP) that is a multifunctional digital image forming apparatus having multiple functions such as copier function, printer function, facsimile function, and scanner function. Hereinafter, the image forming apparatus 2 will also be referred to as MFP 2.

Figure 2:
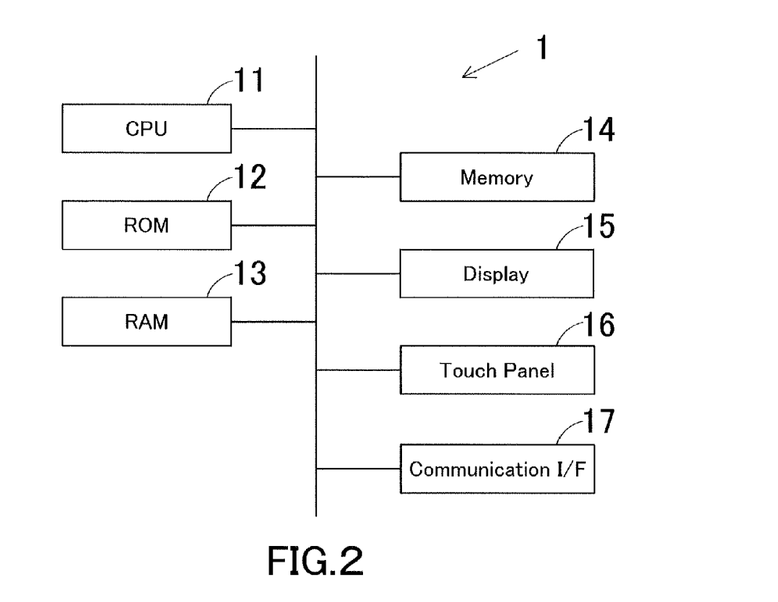
FIG. 2 is a block diagram illustrating an electrical configuration of the portable terminal apparatus.

FIG. 2 is a block diagram illustrating an electrical configuration of the portable terminal apparatus 1.

The portable terminal apparatus 1 is provided with: a CPU 11; a ROM 12; a RAM 13; a memory 14; a display 15; a touch panel 16; a communication interface (communication IF) 17; and others.

The CPU 11 controls the entire portable terminal apparatus 1 in a unified and systematic manner in accordance with an OS, various data processing applications, a cooperation application, and others installed thereon, which will be later described in detail.

The ROM 12 is a memory that stores operation programs for the CPU 11 and other data; the RAM 13 is a memory that provides a work area for the CPU 11 to execute processing in accordance with an operation program.

The memory 14 is a memory that stores: settings screens for the respective users, which are generated; images obtained from Internet; the OS, the various data processing applications, and the cooperation application installed on the portable terminal apparatus 1 as described above; and others.

The display 15, which is liquid-crystal for example, displays instructions and messages for users. The touch panel 16, which is provided over the display 15, detects a user's touch and identifies the coordinate at which the user touches on a screen.

Figure 3:
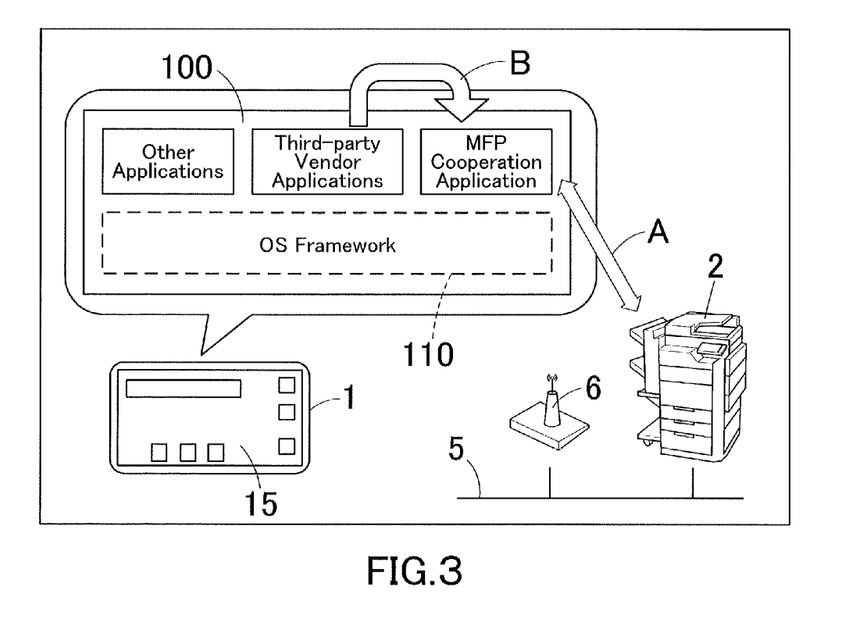
FIG. 3 is a block diagram illustrating a software configuration of the portable terminal apparatus.

The communication interface 17 supports telephone calls over a telephone circuit and wireless data communications with external apparatuses such as the MFP 2 and the web server 3 through an access point 6 (shown in FIG. 3).

FIG. 3 is a block diagram illustrating a software configuration of the portable terminal apparatus 1. Hereinafter, applications (application programs) also will be simply referred to as "apps".

The portable terminal apparatus 1 is provided with an application layer 100 and an OS framework 110.

The application layer 100 includes various applications such as first applications (also will be referred to as "third-party vendor apps") produced by third-party vendors, not the MFP 2 maker, and an MFP cooperation application.

The MFP cooperation application supports cooperation between the third-party vendor application and the MFP 2. When a user operates a third-party vendor application to make the MFP 2 print or transmit by facsimile data processed by the third-party vendor application, the third-party vendor application calls the MFP cooperation application by an inter-application cooperation technique called "intent" or "URL scheme". The MFP cooperation application obtains user information objects indicating users registered on the MFP 2 and settings information objects indicating settings for the respective users, for example restriction information objects indicating restricted functions of the respective users on the MFP 2. On the basis of the obtained information objects, the MFP cooperation application generates job execution settings screens for the respective users. The MFP cooperation application also has a function of connecting each of the generated settings screens to the MFP cooperation application itself and a calling information object for calling the settings screen, which is predefined in such a manner that one of the user information objects is included therein. This will be later described in detail.

The OS framework 110 is a software part based on the standard structure of an OS. The OS is Android OS or iOS, for example.

Hereinafter, the operation of making the MFP 2 execute a job on data from a third-party vendor application, which is performed by the portable terminal apparatus 1 in the cooperation system of FIG. 1, will be described.

First of all, a user activates an MFP cooperation application. Then the MFP cooperation application automatically searches out all MFPs 2 by accessing the network 5 by way of the communication interface 17 and the access point 6. And the user specifies a target MFP 2 among them.

By communicating with the specified target MFP 2, the MFP cooperation application obtains: user names as user information objects indicating users registered on the MFP 2; and restriction information objects indicating restricted functions of the respective users on the MFP 2 as settings information objects indicating settings for the respective users, as indicated by arrow A of FIG. 3. On the basis of the obtained information objects, the MFP cooperation application generates job execution settings screens for the respective users. If the user is restricted to use a function, the MFP cooperation application generates a job execution settings screen that implements the restriction.

Figure 4A:
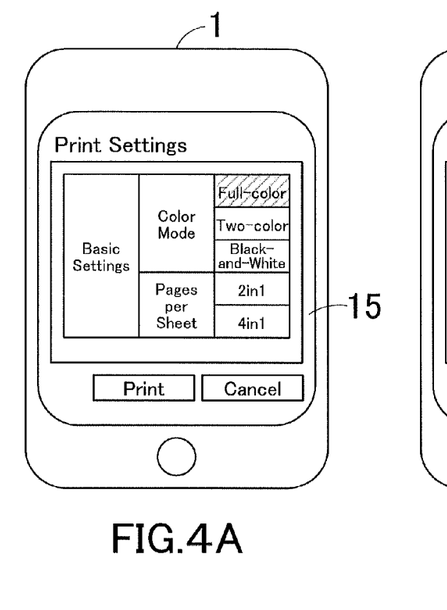
FIG. 4A is an example of a print settings screen to be shown on a display of the portable terminal apparatus.

For example, if User A is prohibited from using full-color printing while being permitted to use black-and-white printing, the MFP cooperation application generates a print settings screen with a mask on the field of full-color print settings as illustrated in FIG. 4A. In FIG. 4A, it is actually hatched instead of being masked just for better understanding.

Figure 4B:
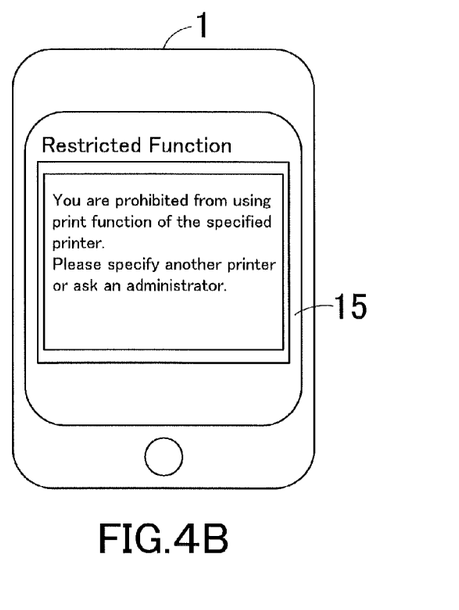
FIG. 4B is an example of a screen to be shown on the same when print function is restricted.

If User B is prohibited from using print function, the MFP cooperation application generates a message screen with a message stating that print function is prohibited as illustrated in FIG. 4B.

After that, the MFP cooperation application connects each of the settings screens to a calling information object for calling the settings screen, which is predefined in such a manner that one of the user information objects is included therein. The calling information objects are important to achieve the inter-application cooperation function of "intent" for Android OS or "URL scheme" for iOS; these serve to call the MFP cooperation application from the third-party vendor application and identify a settings screen for the user who operates the third-party vendor application.

As an example of the calling information objects, "xxx.independent-intent.com" can be suggested as an intent name for "intent" and "http://www.xxx.com" can be suggested as an URL scheme name for "URL scheme". The "xxx" in both the names is a part to be replaced with a user name such as "User A" or "User B".

Figure 5:
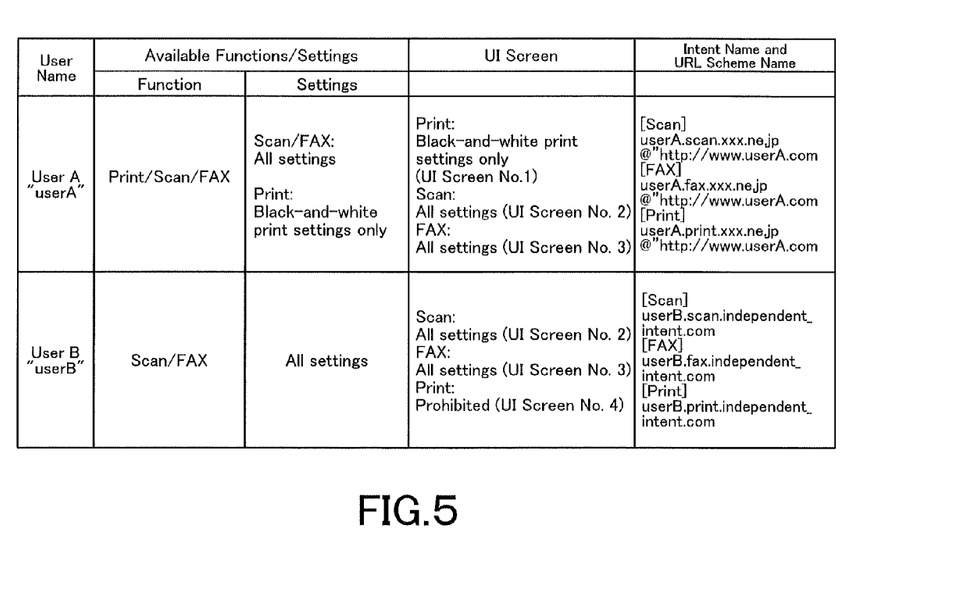
FIG. 5 is an example of a table that contains restriction information objects indicating restriction settings for users on an image forming apparatus.

FIG. 5 is an example of a table that contains: restriction information objects indicating restricted functions of the respective users on the MFP 2; settings screens for the respective users (referred to as "UI screens" in FIG. 5); and calling information objects (intent name and URL scheme name). In this example, User A is permitted to perform all scan and facsimile (FAX) settings and black-and-white print settings. Thus, a print settings screen that allows black-and-white print settings (UI screen No. 1), a scan settings screen that allows all scan settings (UI screen No. 2), and a FAX settings screen that allows all FAX settings (UI screen No. 3) are generated for User A. The print settings screen, the scan settings screen, and the FAX settings screen are connected to the respective calling information objects as referred to in the table of FIG. 5.

User B is permitted to perform all scan and facsimile (FAX) settings while being prohibited from using print function. Thus, a scan settings screen that allows all scan settings (UI screen No. 2), a FAX settings screen that allows all FAX settings (UI screen No. 3), and a message screen with a message stating that print function is prohibited (UI screen No. 4) are generated for User B. The scan settings screen, the FAX settings screen, and the message screen are connected to the respective calling information objects as referred to in the table of FIG. 5.

Meanwhile, when a user activates a third-party vendor application to use print function by operating the third-party vendor application, the third-party vendor application shows a user input dialog so that the user can input a user information object (for example, "User A" as a user name) in it. A user information object may be required to be input at the time of printing or to be stored in advance as a value of print settings. A user information object may be a user ID or other information object that identifies a person (for example, a MAC address of a computer terminal).

After inputting a user information object, the user selects a target document file to be printed and touches a "print" button by operating the third-party vendor application. Upon identifying the user as User A, the third-party vendor application calls an MFP cooperation application by specifying the calling information object for calling an MFP cooperation application, as "userA.independent-intent.com" (for "intent") or "http://www.userA.com" (for "URL scheme") as indicated by Arrow B in FIG. 3.

After an MFP cooperation application is called, the MFP cooperation application identifies a settings screen connected to the specified calling information object, among the settings screens for the respective users, which are generated and stored in advance, and then displays the print settings screen on the display 15. The print settings screen displayed thereon reflects the user's restricted function on the MFP 2.

The user performs print settings as necessary and gives print instructions via the print settings screen displayed on the display 15. Then the target document file and the print settings are transferred to the MFP 2. Upon receiving them, the MFP 2 prints the target document file on the basis of the print settings.

As described above, in this embodiment, when a user operates a third-party vendor application to make the MFP 2 execute a job on data processed by the third-party vendor application, the third-party vendor application calls an MFP cooperation application and the MFP cooperation application displays a print settings screen that reflects the settings information object indicating the user's settings on the MFP 2. This means, the third-party vendor application does not need to have the following functions: obtaining user information objects indicating users registered on the MFP 2 and settings information objects indicating settings for the respective users; and generating and displaying print settings screens on the basis of the obtained information objects. Thus print settings screens that reflect the settings information objects indicating settings for the respective users are displayed without any complicated application.

Users may activate an MFP cooperation application in a direct manner, instead of activating a third-party vendor application to call the MFP cooperation application.

Hereinafter, another embodiment, in which a plurality of users share the portable terminal apparatus 1, will be described below.

Figure 6:
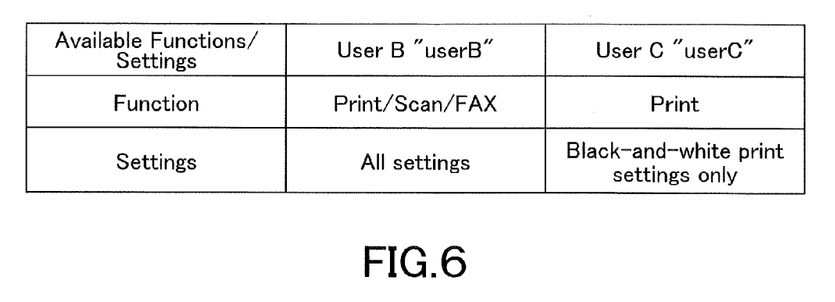
FIG. 6 is another example of a table that contains restriction information objects indicating restriction settings for users on the image forming apparatus.

FIG. 6 is another example of a table that contains settings information objects indicating settings for User B and User C who are registered on the MFP 2. For example, User B is permitted to perform all print, scan, and facsimile settings. User C is permitted to perform black-and-white print settings.

An administrator in charge of the MFP 2 provides the one portable terminal apparatus 1 to User B and User C so that it can be shared.

As shown in this figure, user information objects and settings information objects are obtained from the MFP 2; settings screens for the respective users are generated; and each of the settings screens is connected to a calling information object that is predefined in such a manner that one of the user information objects is included therein.

Meanwhile, when User B activates a third-party vendor application, the third-party vendor application shows a user input dialog so that the user can input a user information object in it.

After inputting a user information object, User B selects a target document file to be printed and touches a "print" button by operating the third-party vendor application. Upon identifying the user as User B, the third-party vendor application calls an MFP cooperation application by specifying the calling information object for calling an MFP cooperation application, as "userB.independent-intent.com", for example.

After an MFP cooperation application is called, the MFP cooperation application identifies a settings screen that is connected to the specified calling information object, among the settings screens for the respective users, which are generated and stored in advance, and then displays the print settings screen that reflects User B restricted functions on the MFP 2, on the display 15.

User B is permitted to perform all print settings as referred to in FIG. 6, thus the print settings screen reproduced thereon allows all print settings.

User B performs print settings as necessary and gives print instructions via the print settings screen displayed on the display 15. Then the MFP 2 performs printing.

Now, User C is trying to use FAX transmission (PC-FAX) by operating the same portable terminal apparatus 1.

When User C activates the third-party vendor application, the third-party vendor application shows a user input dialog so that the user can input a user information object in it.

After inputting a user information object, User C selects a target document file to be transmitted by FAX to call the MFP cooperation application, by operating the third-party vendor application. Upon identifying the user as User C, the third-party vendor application calls the MFP cooperation application by specifying the calling information object for calling an MFP cooperation application, as "userC.independent-intent.com", for example.

After the MFP cooperation application is called, the MFP cooperation application identifies a settings screen that is connected to the specified calling information object, among the settings screens for the respective users, which are generated and stored in advance, and then displays the print settings screen that reflects User C restricted functions on the MFP 2, on the display 15.

User C is prohibited from using FAX transmission as referred to in FIG. 6, thus the print settings screen reproduced thereon has a message stating as "you are prohibited from using FAX transmission" and the user cannot perform FAX transmission settings.

Figure 7:
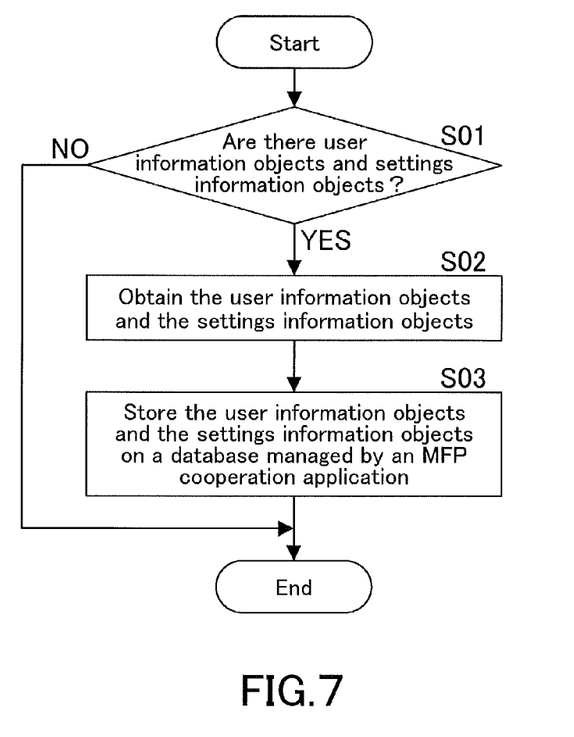
FIG. 7 is a flowchart representing the operation of obtaining user information objects and other information objects, which is performed by the portable terminal apparatus in accordance with a cooperation application.

FIG. 7 is a flowchart representing the operation of obtaining user information objects and other information objects, which is performed by the portable terminal apparatus 1 in accordance with an MFP cooperation program. The flowchart of FIG. 7 and the following flowcharts are executed by the CPU 11 of the portable terminal apparatus 1 in accordance with MFP cooperation programs.

In Step S01, it is judged whether or not an accessed MFP 2 stores user information objects indicating registered users and settings information objects indicating settings for the respective users. If the MFP 2 stores (YES in Step S01), the user information objects and the settings information objects are obtained in Step S02, and stored on a database (DB) of the memory 14 that is managed by an MFP cooperation application in Step S03.

If the MFP 2 does not store the user information objects and the settings information objects (NO in Step S01), the routine terminates.

Figure 8:
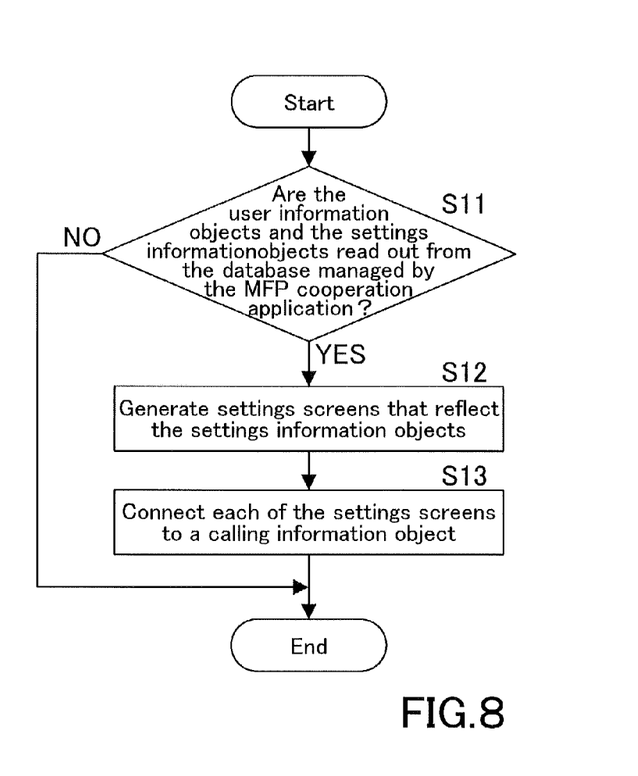
FIG. 8 is a flowchart representing the operation of generating settings screens and connecting data objects to each other, which is performed by the portable terminal apparatus in accordance with a cooperation application.

FIG. 8 is a flowchart representing the operation of generating settings screens and connecting data objects to each other, which is performed by the portable terminal apparatus 1 in accordance with an MFP cooperation program.

In Step S11, it is judged whether or not the user information objects and the settings information objects are read out from the database managed by the MFP cooperation application. If it is read out (YES in Step S11), settings screens that match the settings information objects are generated in Step S12.

Subsequently, each of the settings screens for the respective users is connected to a calling information object (for example, intent name or URL scheme name) in Step S13.

Back to Step S11, if the user information objects and the settings information objects are not read out from the database managed by the MFP cooperation application (NO in Step S11), the routine terminates.

Figure 9:
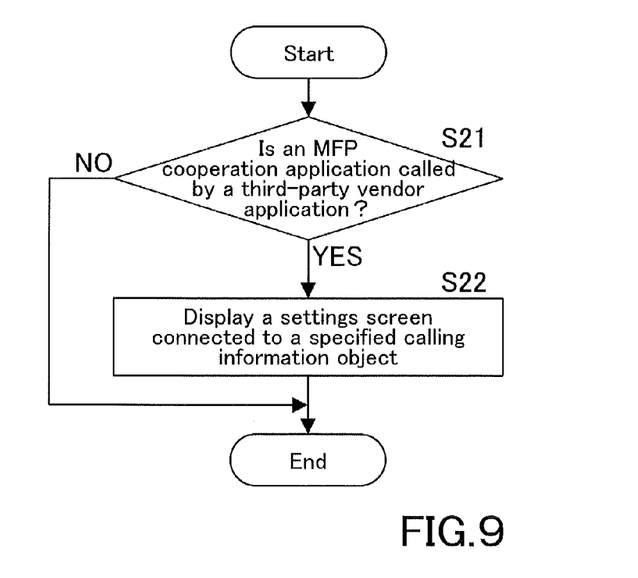
FIG. 9 is a flowchart representing the operation of displaying a settings screen, which is performed by the portable terminal apparatus in accordance with a cooperation application.

FIG. 9 is a flowchart representing the operation of displaying a settings screen, which is performed by the portable terminal apparatus 1 in accordance with an MFP cooperation program.

In Step S21, it is judged whether or not any settings screen is called by a third-party vendor application. If it is called (YES in Step S21), a settings screen that is connected to a specified calling information object is displayed on the display 15 in Step S22.

In Step S21, if it is not called by a third-party vendor application (NO in Step S21), the routine terminates.

In the aforementioned embodiments, the MFP cooperation application obtains user information objects indicating registered users and settings information objects indicating settings for the respective users from the MFP 2, and then generates settings screens for the respective users. In addition, the MFP cooperation application may obtain a status information object indicating a status of the MFP 2, such as breakdown, toner run-out, or paper run-out, on a regular basis, then displays a status screen showing the status on the display 15 as necessary, instead of a settings screen for the user.

Figure 10:
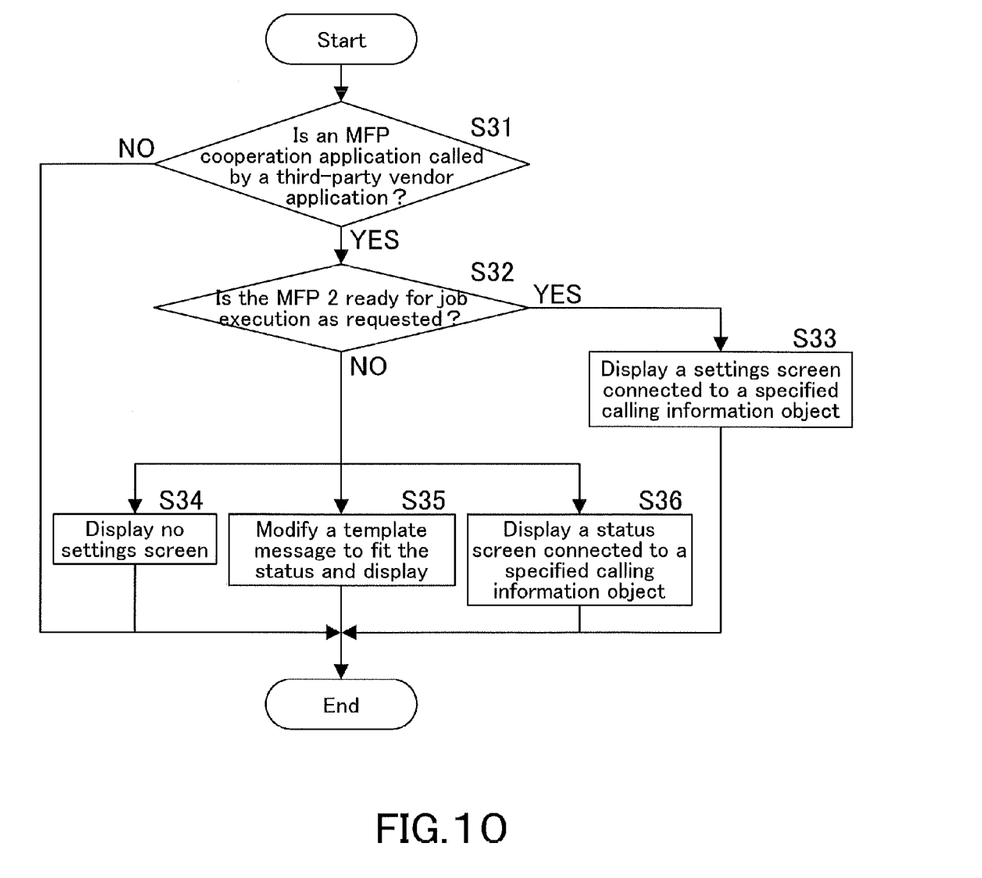
FIG. 10 is another flowchart representing the operation of displaying a settings screen, which is performed by the portable terminal apparatus in accordance with a cooperation application.

This operation will be further described with reference to the flowchart of FIG. 10.

In Step S31, it is judged whether or not any settings screen is called by a third-party vendor application. If it is called (YES in Step S31), then it is judged in Step S32 whether or not the MFP 2 is ready for executing a print job, for example, as requested. If the MFP 2 is ready for job execution (YES in Step S32), a settings screen for the user, which is connected to a specified calling information object is displayed on the display 15 in Step S33.

If the MFP 2 is not ready for job execution as requested because of a trouble such as breakdown (NO in Step S32), Step S34, S35, or S36 will be conducted in accordance with a predetermined procedure.

In Step S34, no screen is displayed. It is preferred that the routine go to this step if the trouble is so serious that there is a need for a field service representative, for example. In Step S35, a template message stored on a recording medium such as the memory 14 is modified to fit the status, and then displayed. In Step S36, instead of a settings screen that is connected to a specified calling information object, a status screen showing a status is displayed. That is, instead of settings screens for the respective users, it is necessary to generate status screens showing statuses and connect each of the status screens to a calling information object in advance, and then instead of a settings screen, a status screen that is connected to a specified calling information object is displayed when an MFP cooperation application is called.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. A portable terminal apparatus being capable of having the following applications installed thereon: a first application; and a cooperation application supporting cooperation between the first application and a job execution apparatus, the portable terminal apparatus comprising:
   a display;
   a communication portion that performs communication with the job execution apparatus;
   an obtaining portion that obtains user information objects indicating users registered on the job execution apparatus and settings information objects indicating settings for the respective users, from the job execution apparatus through the communication part, in accordance with the cooperation application;
   a screen data generator that generates job execution settings screens for the respective users on the basis of the user information objects and the settings information objects both obtained by the information obtaining portion, in accordance with the cooperation application;
   a connecting portion that connects each of the settings screens generated by the screen data generator, to the cooperation application and a calling information object for calling the settings screen in accordance with the cooperation application, the calling information object being predefined in such a manner that one of the user Information objects is included therein;
   a calling portion that calls the cooperation application by specifying the calling information object, the calling information object including the user information object indicating a user who operates the first application to make the job execution apparatus execute a job on data processed by the first application; and
   a display controller that identifies a settings screen connected to the calling information object including the user information object indicating the user who operates the first application, among the settings screens connected to the calling information objects by the connecting portion, and makes the display show the identified settings screen, in accordance with the cooperation application called by the calling portion.

2. The portable terminal apparatus as recited in claim 1, wherein:
   the information obtaining portion further obtains status information objects indicating statuses of the job execution apparatus from the job execution apparatus through the communication portion, in accordance with the cooperation application;
   the screen data generator generates status screens showing the statuses of the job execution apparatus on the basis of the status information objects obtained by the information obtaining portion, in accordance with the cooperation application; and
   the display controller makes the display show the status screens instead of the settings screens.

3. The portable terminal apparatus as recited in claim 1, wherein:
   the settings information objects indicating settings for the respective users are restriction information objects indicating restricted functions of the respective users on the job execution apparatus; and
   if the user who operates the first application is restricted to use a function, the screen data generator generates a job execution settings screen reflecting the restriction.

4. A method of displaying job execution settings screens, the method to be implemented by a portable terminal apparatus being capable of having the following applications installed thereon: a first application; and a cooperation application supporting cooperation between the first application and a job execution apparatus, the method comprising:
   performing communication with the job execution apparatus;
   obtaining user information objects indicating users registered on the job execution apparatus and settings information objects indicating settings for the respective users, by communicating with the job execution apparatus, in accordance with the cooperation application;
   generating job execution settings screens for the respective users on the basis of the user information objects and the settings information objects both being obtained, in accordance with the cooperation application;
   connecting each of the generated settings screens to the cooperation application and a calling information object for calling the settings screen in accordance with the cooperation application, the calling information object being predefined in such a manner that one of the user information objects is included therein;
   calling the cooperation application by specifying the calling information object, the calling information object including the user information object indicating a user who operates the first application to make the job execution apparatus execute a job on data processed by the first application; and
   identifying a settings screen connected to the calling information object including the user information object indicating the user who operates the first application, among the settings screens connected to the calling information objects and displaying the identified settings screen on a display, in accordance with the called cooperation application.

5. The method of displaying job execution settings screens as recited in claim 4, wherein:
   status information objects indicating statuses of the job execution apparatus are further obtained by communication with the job execution apparatus, in accordance with the cooperation application;
   status screens showing the statuses of the job execution apparatus are generated on the basis of the status information objects obtained from the job execution apparatus, in accordance with the cooperation application; and
   instead of the settings screens, the status screens are displayed on the display.

6. The method of displaying job execution settings screen as recited in claim 4, wherein:
   the settings information objects indicating settings for the respective users are restriction information objects indicating restricted functions of the respective users on the job execution apparatus; and
   if the user who operates the first application is restricted to use a function, a job execution settings screen reflecting the restriction is generated.

7. A non-transitory computer-readable recording medium having a program of displaying job execution settings screens, the program being stored thereon to make a computer of a portable terminal apparatus being capable of having the following applications installed thereon: a first application; and a cooperation application supporting cooperation between the first application and a job execution apparatus, execute the following steps:

performing communication with the job execution apparatus;

obtaining user information objects indicating users registered on the job execution apparatus and settings information objects indicating settings for the respective users, by communicating with the job execution apparatus, in accordance with the cooperation application;

generating job execution settings screens for the respective users on the basis of the user information objects and the settings information objects both being obtained, in accordance with the cooperation application;

connecting each of the generated settings screens to the cooperation application and a calling information object for calling the settings screen in accordance with the cooperation application, the calling information object being predefined in such a manner that one of the user information objects is included therein;

calling the cooperation application by specifying the calling information object, the calling information object including the user information object indicating a user who operates the first application to make the job execution apparatus execute a job on data processed by the first application; and     identifying a settings screen connected to the calling information object including the user information object indicating the user who operates the first application, among the settings screens connected to the calling information objects and displaying the identified settings screen on a display, in accordance with the called cooperation application.

8. The non-transitory computer-readable recording medium having the program of displaying job execution settings screens as recited in claim 7, wherein:

status information objects indicating statuses of the job execution apparatus are further obtained by communication with the job execution apparatus, in accordance with the cooperation application;

status screens showing the statuses of the job execution apparatus are generated on the basis of the status information objects obtained from the job execution apparatus, in accordance with the cooperation application; and     instead of the settings screens, the status screens are displayed on the display.

9. The non-transitory computer-readable recording medium having the program of displaying job execution settings screens as recited in claim 7, wherein:

the settings information objects indicating settings for the respective users are restriction information objects indicating restricted functions of the respective users on the job execution apparatus; and     if the user who operates the first application is restricted to use a function, a job execution settings screen reflecting the restriction is generated.

\* \* \* \* \*